(12) United States Patent
Boutillier et al.

(10) Patent No.: US 12,152,100 B2
(45) Date of Patent: Nov. 26, 2024

(54) POLYMERIC COMPOSITION FOR WATERCRAFTS, ITS USE AND WATERCRAFT COMPRISING IT

(71) Applicant: Trinseo Europe GmbH, Pfaeffikon (CH)

(72) Inventors: Jean-Marc Boutillier, Lacq (FR); Laurent Jaurey, Bayonne (FR)

(73) Assignee: TRINSEO EUROPE GMBH, Pfaeffikon (CH)

( * ) Notice: Subject to any disclaimer, the term of this patent is extended or adjusted under 35 U.S.C. 154(b) by 469 days.

(21) Appl. No.: 17/279,641

(22) PCT Filed: Sep. 25, 2019

(86) PCT No.: PCT/EP2019/075925
§ 371 (c)(1),
(2) Date: Mar. 25, 2021

(87) PCT Pub. No.: WO2020/064871
PCT Pub. Date: Apr. 2, 2020

(65) Prior Publication Data
US 2021/0388145 A1 Dec. 16, 2021

(30) Foreign Application Priority Data

Sep. 25, 2018 (FR) ..................... 18.58744

(51) Int. Cl.
*B63B 32/57* (2020.01)
*B29K 33/00* (2006.01)
(Continued)

(52) U.S. Cl.
CPC ............ *C08F 293/005* (2013.01); *B63B 5/24* (2013.01); *B63B 32/57* (2020.02); *B63B 35/00* (2013.01);
(Continued)

(58) Field of Classification Search
CPC .............. C08F 293/005; C08F 2438/02; C08F 2810/20; B63B 5/24; B63B 32/57;
(Continued)

(56) References Cited

U.S. PATENT DOCUMENTS 4,925,417 A * 5/1990 Warren .................. B63C 11/49
114/66
D377,072 S 12/1996 Ilejay
(Continued)

FOREIGN PATENT DOCUMENTS

WO WO 2010/012938 2/2010
WO WO 2010/012938 A1 2/2010
(Continued)

OTHER PUBLICATIONS

French Preliminary Search Report for French Application No. 1858744, dated Jul. 16, 2021 with translation, 10 pages.
(Continued)

*Primary Examiner* — Anthony D Wiest
(74) *Attorney, Agent, or Firm* — Buchanan Ingersoll & Rooney PC (57) ABSTRACT

The present invention relates to a polymeric composition suitable for watercrafts or nautical applications. The present invention relates also the use of a transparent polymeric composition for watercrafts. More particularly the present invention relates to a transparent (meth)acrylic polymer composition and relates also to a process for preparing such a (meth)acrylic polymer composition, its use in watercrafts and watercraft comprising it.

18 Claims, 4 Drawing Sheets

(51) Int. Cl.

| | |
|---|---|
| *B29K 96/04* | (2006.01) |
| *B29K 105/00* | (2006.01) |
| *B29K 105/24* | (2006.01) |
| *B29L 31/30* | (2006.01) |
| *B63B 5/24* | (2006.01) |
| *B63B 35/00* | (2020.01) |
| *C08F 293/00* | (2006.01) |
| *C08J 5/12* | (2006.01) |
| *C08J 5/18* | (2006.01) |
| *B29C 51/00* | (2006.01) |

(52) U.S. Cl.
CPC ............... *C08J 5/121* (2013.01); *C08J 5/124* (2013.01); *C08J 5/18* (2013.01); *B29C 51/002* (2013.01); *B29K 2033/08* (2013.01); *B29K 2096/04* (2013.01); *B29K 2105/0085* (2013.01); *B29K 2105/24* (2013.01); *B29L 2031/307* (2013.01); *C08F 2438/02* (2013.01); *C08F 2810/20* (2013.01); *C08J 2353/00* (2013.01)

(58) Field of Classification Search
CPC ......... B63B 35/00; B63B 32/59; B63B 34/21; C08J 5/121; C08J 5/124; C08J 5/18; C08J 2353/00; B29C 51/002; B29K 2033/08; B29K 2096/04; B29K 2105/0085; B29K 2105/24; B29L 2031/307; C08L 53/00
See application file for complete search history.

(56) References Cited

U.S. PATENT DOCUMENTS

| | | | |
|---|---|---|---|
| 6,302,043 B1* | 10/2001 | Wippermann | B63H 16/12 |
| | | | 114/66 |
| 9,327,807 B1* | 5/2016 | Masson | B63B 32/60 |
| 2005/0064774 A1 | 3/2005 | Grune et al. | |
| 2005/0233124 A1 | 10/2005 | Marot et al. | |
| 2013/0281629 A1 | 10/2013 | Pirri et al. | |
| 2015/0038650 A1 | 2/2015 | Bourrigaud et al. | |
| 2016/0257383 A1 | 9/2016 | Masson et al. | |
| 2017/0113767 A1 | 4/2017 | McCracken et al. | |
| 2017/0174299 A1 | 6/2017 | McKellar et al. | |
| 2018/0057128 A1* | 3/2018 | Dowling | B63G 8/18 |
| 2019/0233603 A1 | 8/2019 | Escale et al. | |

FOREIGN PATENT DOCUMENTS

| | | |
|---|---|---|
| WO | 2012038441 A1 | 3/2012 |
| WO | 2014013028 A1 | 1/2014 |
| WO | 2018002260 A1 | 1/2018 |

OTHER PUBLICATIONS

Office Action (Communication pursuant to Article 94(3) EPC) issued May 31, 2024, by the European Patent Office in corresponding European Patent Application No. 19 772 767.0-1102. (6 pages).

Communication Pursuant to Article 94(3) EPC issued Sep. 25, 2024, by the European Patent Office in corresponding European Patent Application No. 19772767.0-1102. (5 pages).

* cited by examiner

POLYMERIC COMPOSITION FOR WATERCRAFTS, ITS USE AND WATERCRAFT COMPRISING IT

This application claims benefit, under U.S.C. § 119 or § 365 of PCT Application Number PCT/EP2019/075925, filed Sep. 25, 2019, and French Patent Application Number FR 1858744, filed Sep. 25, 2018, these documents being incorporated herein by reference.

FIELD OF THE INVENTION

The present invention relates to a polymeric composition suitable for watercrafts or nautical applications.

The present invention relates also the use of a transparent polymeric composition for watercrafts.

More particularly the present invention relates to a transparent (meth)acrylic polymer composition and relates also to a process for preparing such a (meth)acrylic polymer composition, its use in watercrafts and watercraft comprising it.

Technical Problem

Watercrafts are boats or other vessels that travel on water used for transportation or water related sports. Typical watercrafts are made of solid materials non transparent materials. Nautical application concerns an object that is used or floats on or in or under water. Thus, the user may not view the scene under water, either for viewing plant and fishes or detecting rocks or cliffs underneath.

Transparent polymers are widely used because they are much lighter than glass. Acrylic and (meth)acrylic polymers, often just called PMMA, are also widely used for their transparence and scratch resistance. Especially excellent optical properties are valued, in particular the gloss and a high transparency with a large transmission of visible light. However, it is also a brittle impact-sensitive thermoplastic material. This characteristic is related to the fact that the glass transition temperature of PMMA is approximately 110° C., so that, in this material, the polymer chains are not capable of readily moving at ambient temperature. The impact performance needs to be improved for some applications where material is exposed to impacts during its use, while retaining its transparency.

Thus, the objective of the present invention is to provide a polymeric composition that is highly transparent, has sufficient mechanical properties as impact resistance and rigidity, for being suitable for a watercraft or nautical applications.

The objective of the present invention is also to provide a polymeric composition that can be used for a watercraft that is in large parts transparent, so that the user can see easily through the watercraft.

Another objective is to provide a process to manufacture a composition suitable for a watercraft, said composition has to highly transparent, has sufficient mechanical properties as impact resistance and rigidity.

Still another objective provide a process to manufacture a watercraft that has large transparent parts of a polymeric composition which has sufficient mechanical properties as impact resistance and rigidity.

An additional objective of the present invention is to provide a watercraft or an object for nautical application that has large transparent parts of a polymeric composition which has sufficient mechanical properties as impact resistance and rigidity.

The watercraft is used in different environments, including change of temperature. Therefore, the polymeric composition should stay transparent with environmental changes, especially temperature changes.

BACKGROUND OF THE INVENTION

Prior Art

The document AU 199861887B1 describes a surfboard having a viewing window.

The U.S. Pat. No. Des. 377,072 shows a surfboard with a transparent window. The small transparent window is integrated in the board with a narrow visibility field. In order to see through the person has to be right above and close to the window.

The document US2017/0113767 describes a water window apparatus. The window is integrated in a sports water board. The window is made out of a clear thermoplastic material as polycarbonate or acrylics. The window is only a little part of the board, allowing only a restrained field of vision.

The document US2005/0064774 discloses a transparent wave riding vehicle. The surfboard described comprises a core made of transparent polymeric foams from high Tg polymer comprising submicron cells and a cover layer of clear coating.

The document US2016/0257383 discloses a transparent and buoyant aquatic recreation assembly. The assembly is a system comprising a board with an elongated buoyant body and a battery-powered camera. The board may be constructed from a transparent material including plastics.

The document US2017/0174299 discloses a standup paddleboard with a view port. The view port is made of a transparent material, including polymers. The view port makes up only a small part of the total surface of the standup paddleboard.

In the prior art there is no transparent composition for a watercraft that is in large parts transparent or a watercraft that allows a non-restrained view and that comprises a polymeric material that can be moulded or thermoformed.

BRIEF DESCRIPTION OF THE INVENTION

Surprisingly is has been discovered that a polymeric composition PC1 comprising a transparent polymer TP1 is suitable for watercrafts or nautical applications.

Surprisingly is has also been discovered that a polymeric composition PC1 comprising as a transparent polymer TP1 a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol is suitable for watercrafts.

It has also been discovered that a polymeric composition PC1 comprising a transparent polymer TP1 can be used for watercrafts or nautical applications, especially for large transparent parts of the watercrafts or nautical applications.

Surprisingly it has also been discovered that a polymeric composition PC1 comprising a transparent polymer TP1 and especially as a transparent polymer TP1 a crosslinked (meth) acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol can be used for watercrafts or nautical applications, especially for transparent parts of the watercrafts or for nautical applications.

Surprisingly is has additionally been discovered that a process comprising the steps of:
a) preparing the macromolecular sequences (II) by mixing, with the monomer(s) intended to form the macromolecular sequences (II), an alkoxyamine of general formula $Z(-T)_n$, in which Z denotes a polyvalent group, T denotes a nitroxide and n is an integer greater than or equal to 1;
b) mixing the macromolecular sequences (II) of step a) with methyl methacrylate, and optionally a crosslinking agent, optionally at least one comonomer M and optionally at least one radical initiator;
c) mixing the composition comprising the macromolecular sequences (II) and methyl methacrylate with crosslinking agent, optionally at least one comonomer M and at least one radical initiator, if it has not been done yet in step b);
d) casting the mixture obtained in previous step in a mold and then heating it according to a temperature cycle in order to obtain a cast sheet;
yields to a polymeric composition PC1 suitable for watercrafts or nautical applications said polymeric composition PC1 is comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol.

It has also been found that a process comprises the steps of
a) providing a polymeric composition PC1 comprising a transparent polymer TP1
b) assembling polymeric composition PC1
yields to a watercraft or nautical applications that comprises transparent parts.

It has also been found that an object or device in form of a watercraft or for watersports or for nautical applications that is in large parts transparent, said transparent part comprises a polymeric composition PC1, said polymeric composition PC1 is comprising a transparent polymer TP1, yields to an object or device that has sufficient mechanical properties as impact resistance and rigidity and is suitable for observing under water.

BRIEF DESCRIPTION OF DRAWINGS

FIG. 1a) shows a completely non transparent surfboard.
FIG. 1b) shows a surfboard comprising a small transparent window.
FIG. 1c) shows a surfboard as watercraft made of and using a polymeric composition according to the invention.
FIG. 1d) shows a surfboard as watercraft made of and using a polymeric composition according to the invention, but not completely transparent.
FIG. 1e) shows a surfboard as watercraft made of and using a polymeric composition according to the invention, but not completely transparent.
In FIG. 2a the entire bottom is the transparent viewing window (17).
In FIG. 2b a large part of bottom is the transparent viewing window (17). Nevertheless in both cases also large parts under water surface (11) are transparent.

DETAILED DESCRIPTION OF THE INVENTION

According to a first aspect, the present invention relates to a polymeric composition PC1 suitable for watercrafts or nautical applications said polymeric composition PC1 is comprising a transparent polymer TP1.

According to second aspect the present invention relates to a polymeric composition PC1 suitable for watercrafts or nautical applications said polymeric composition PC1 is comprising a transparent polymer TP1 comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol.

According to a third aspect the present invention relates to the use of a polymeric composition PC1 suitable for watercrafts or nautical applications, said polymeric composition PC1 is comprising a transparent polymer TP1.

According to a fourth aspect the present invention relates to the use of a polymeric composition PC1 suitable for watercrafts or nautical applications, said polymeric composition PC1 is comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol, for watercrafts or nautical applications, especially watercrafts that are largely transparent.

According to a fifth aspect the present invention relates to a process for making polymeric composition PC1 suitable for watercrafts or nautical applications, said polymeric composition PC1 is comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol, said process comprises the steps of:
  a) preparing the macromolecular sequences (II) by mixing, with the monomer(s) intended to form the macromolecular sequences (II), an alkoxyamine of general formula $Z(-T)_n$, in which Z denotes a polyvalent group, T denotes a nitroxide and n is an integer greater than or equal to 1;
  b) mixing the macromolecular sequences (II) of step a) with methyl methacrylate, and optionally a crosslinking agent, optionally at least one comonomer M and optionally at least one radical initiator;
  c) mixing the composition comprising the macromolecular sequences (II) and methyl methacrylate with crosslinking agent, optionally at least one comonomer M and at least one radical initiator, if it has not been done yet in step b);
  d) casting the mixture obtained in previous step in a mold and then heating it according to a temperature cycle in order to obtain a cast sheet.

According to a sixth aspect the present invention relates to a process for making a watercraft or nautical object that comprises a polymeric composition PC1 said polymeric composition PC1 is comprising a transparent polymer TP1, said process comprises the steps of
  a) providing a polymeric composition PC1
  b) assembling polymeric composition PC1.

According to a seventh aspect the present invention relates to a process for making a watercraft or nautical object that comprises a polymeric composition PC1 said polymeric composition PC1 is comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol, said process comprises the steps of
  a) providing a polymeric composition PC1
  b) assembling polymeric composition PC1.

According to a eight aspect the present invention relates to an object in form of a watercraft or nautical object that is in large parts transparent, said transparent part comprises a polymeric composition PC1, said polymeric composition PC1 is comprising a transparent polymer TP1.

According to an ninth aspect the present invention relates to an object in form of a watercraft or nautical object that is in large parts transparent, said transparent part comprises a polymeric composition PC1, said polymeric composition PC1 is comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol According to a tenth aspect the present invention relates to a device for water sports or nautical object that is in large parts transparent, said transparent part comprises a polymeric composition PC1, said polymeric composition PC1 is comprising a transparent polymer TP1.

According to a eleventh aspect the present invention relates to a device for water sports or nautical object that is in large parts transparent, said transparent part comprises a polymeric composition PC1, said polymeric composition PC1 is comprising a crosslinked (meth)acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 and 800 000 g/mol.

By the term "copolymer" as used is denoted that the polymer consists of at least two different monomers.

By the term "(meth)acrylic monomer" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "impact modifier" as used is understood a material that once incorporated in a polymeric material increases the impact resistance and toughness of that polymeric material by phase micro domains of a rubbery material or rubber polymer.

By the term "rubber" as used is denoted to the thermodynamic state of the polymer above its glass transition.

By the term "rubber polymer" as used is denoted a polymer that has a glass transition temperature (Tg) below 0° C.

By the term "crosslinking" as used is meant a polymer copolymer, some of the chains of which are connected to one another via covalent bonds or chemical or physical interactions. These chains, connected to one another, are for the most part distributed in the 3 dimensions of the space.

By the term "elastomeric domains having a characteristic dimension of less than 100 nm consisting of macromolecular sequences (II) having a flexible nature with a glass transition temperature of less than 0° C." is denoted a nanostructure with that dimension by micro phase separation of said macromolecular sequences (II). The phase separation can be a lamellar structure or spheres of said nanometer size, that are not cross-linked, contrary to core-shell impact modifiers, where the "soft" rubber core is usually crosslinked.

By the term "transparent polymer" as used is meant that the polymeric composition has a high light transmission of at least 80% in the visible light according to ASTM D1003 for a sheet made out of this polymeric composition having a thickness of 3 mm.

By saying that a range is between x and y in the present invention, it is meant that the upper and lower limit of this range are excluded, equivalent to more than x and less than y.

With regard to the polymeric composition PC1 according to the invention, suitable for watercrafts, comprising a transparent polymer TP1, said transparent polymer TP1 it is chosen from a polycarbonate PC or a (meth)acrylic block copolymer MBC or a (meth)acrylic polymer composition MP1 or a crosslinked (meth) acrylic composition MCX or a blend thereof.

Preferably the transparent polymer TP1 it is chosen from (meth)acrylic block copolymer MBC or (meth)acrylic polymer composition MP1 or crosslinked (meth) acrylic composition MCX.

In a first preferred embodiment the transparent polymer TP1 it is chosen from a (meth)acrylic block copolymer MBC or crosslinked (meth) acrylic composition MCX.

The polycarbonate PC is a polyester of carbonic acid, that is to say a polymer obtained by the reaction of at least one carboxylic acid derivative with at least one aromatic or aliphatic diol.

The (meth)acrylic block copolymer MBC comprises at least one block B having a glass transition temperature less than 20° C. preferably less than 10° C. more preferably less than 0° C., advantageously less than −5° C. and more advantageously less than −10° C.

Preferably (meth)acrylic block copolymer MBC comprises at least one block which is an (meth)acrylic block. By this is meant that at least 50 wt % of the monomers inside this block are alkyl (meth)acrylate monomers, that have been polymerized.

Most preferably the (meth)acrylic block copolymer MBC comprises least 50 wt % of the monomers inside (meth) acrylic block copolymer MBC are alkyl(meth)acrylate monomers, that have been polymerized.

The (meth)acrylic block copolymer MBC is having a general formula $(A)_nB$ in which:

n is an integer of greater than or equal to 1,

A is: an acrylic or methacrylic homo- or copolymer having a Tg of greater than 50° C., preferably of greater than 80° C., or polystyrene, or an acrylic/styrene or methacrylic/styrene copolymer. Preferably, A is chosen from methyl methacrylate (MMA), phenyl methacrylate, benzyl methacrylate or isobornyl methacrylate. Preferably, the block A is PMMA or PMMA modified with acrylic or methacrylic comonomers;

B is an acrylic or methacrylic homo- or copolymer having a Tg of less than 20° C., preferably comprising monomers chosen of methyl acrylate, ethyl acrylate, butyl acrylate (BuA), ethylhexyl acrylate, styrene (Sty) or butyl methacrylate, more preferably butyl acrylate said monomers make up at least 50 wt %, preferably 70 wt % of B.

Advantageously the (meth)acrylic block copolymer MBC is amorphous.

Preferably, in the block A the monomer is chosen from methyl methacrylate (MMA), phenyl methacrylate, benzyl methacrylate, isobornyl methacrylate, styrene (Sty) or alpha-methylstyrene or mixtures thereof. More preferably, the block A is PMMA or PMMA copolymerized with acrylic or methacrylic comonomers or polystyrene (PS) or PS modified with styrenic comonomers.

Preferably the block B comprises monomers chosen of methyl acrylate, ethyl acrylate, butyl acrylate (BuA), ethylhexyl acrylate or butyl methacrylate and mixtures thereof, more preferably butyl acrylate said monomers make up at least 50 wt %, preferably 70 wt % of block B. Preferably the block B comprises no crosslinker. The one or more monomer(s) for preparing the block B comprises no monomers with two double bonds that are polymerizable.

Furthermore, the blocks A and/or B can comprise other acrylic or methacrylic comonomers carrying various chemical function groups known to a person skilled in the art, for example acid, amide, amine, hydroxyl, epoxy or alkoxy functional groups. The block A can incorporate groups, such as acrylic acid or methacrylic acid (MAA), in order to increase the temperature stability of thereof.

Comonomers like styrene can also be incorporated in the block B in order to mismatch the refractive index of the block A.

Preferably, said thermoplastic (meth)acrylic block copolymer MBC has a structure chosen from: ABA, AB, $A_3B$ and $A_4B$.

The (meth) acrylic block copolymer MBC for example can be one of the following triblock copolymers: pMMA-pBuA-pMMA, p(MMAcoMAA)-pBuA-p(MMAcoMAA), p(MMAcoMAA)-p(BuAcoSty)-p(MMAcoMAA) and p(MMAcoAA)-pBuA-p(MMAcoAA). In a first preferred embodiment, the (meth)acrylic block copolymer MBC is p(MMAcoMAA)-p(BuAcoSty)-p(MMAcoMAA).

It is known to a person skilled in the art that the polymers of PMMA type can comprise small amounts of acrylate comonomer in order to improve the temperature stability thereof. By small is meant less than 9 wt %, preferably less than 7 wt % and more preferably less than 6 wt % of the polymer.

The block B represents from 10% to 85%, preferably 15% to 80% of the total weight of the block copolymer MBC.

The block B has a weight-average molar mass of between 10 000 g/mol and 500 000 g/mol, preferably from 20 000 g/mol to 300 000 g/mol. The weight average molar mass can be measured by size exclusion chromatography (SEC).

The (meth)acrylic block copolymers participating in the polymeric composition PC1 can be obtained by controlled radical polymerization (CRP) or by anionic polymerization; the most suitable process according to the type of copolymer to be manufactured will be chosen.

Preferably, this will be CRP, in particular in the presence of nitroxides, for the (meth)acrylic block copolymers of $(A)_nB$ type and anionic or nitroxide radical polymerization, for the structures of ABA type, such as the triblock copolymer MAM. Controlled radical polymerization is described in the document for obtaining block copolymers, i.e. in WO03/062293.

The polydispersity index of the molecular weight Mw/Mn of the (meth)acrylic block copolymers of $(A)_nB$ type is greater than 2, preferably greater than 2.5 and more preferably greater than 3.

The polydispersity index of the molecular weight Mw/Mn the (meth)acrylic block copolymers of $(A)_nB$ type is between 2.5 and 10.0, preferably between 3.0 and 10.0, more preferably between 3.0 and 6.0 and even more preferably between 3.0 and 5.0

The (meth)acrylic block copolymer MBC can be transformed by extrusion or injection molding in form of a sheet.

The (meth)acrylic polymer composition MP1 comprises or is a (meth)acrylic polymer AP1 with a polymeric polymer chain comprising at least 50 wt % of monomers coming acrylic and/or methacrylic monomers. The (meth)acrylic polymer could also be a mixture of two or more (meth) acrylic polymer AP1 to APx.

The acrylic and/or methacrylic monomers are chosen from acrylic acid, methacrylic acid, esters of acrylic acid of esters of methacrylic acid, alkyl acrylic monomers, alkyl methacrylic monomers and mixtures thereof.

Preferably the monomer is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the (meth)acrylic monomer is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

Other comonomers can be copolymerized with the acrylic and/or methacrylic monomers as long as the (meth)acrylic polymer AP1 is comprising at least 50 wt % of monomers coming acrylic and/or methacrylic monomers in its polymeric chain. The other comonomers can be chosen from styrenic monomers as styrene or styrene deriviatives, acrylonitrile, vinylesters as vinylacetate. The amount of these comonomers is from 0 wt % to 50 wt %, preferably from 0 wt % to 40 wt %, more preferably from 0 wt % to 30 wt %, advantageously from 0 wt % to 20 wt %.

In a first preferred embodiment the (meth)acrylic polymer AP1 is a homo- or copolymer of methyl methacrylate (MMA.) that comprises at least 50%, preferably at least 60%, advantageously at least 70% and more advantageously at least 80% by weight of methyl methacrylate.

The copolymer of methyl methacrylate (MMA) comprises between 50% and 99.9% by weight of methyl methacrylate and between 0.1 and 50% by weight of at least one monomer having at least one ethylenic unsaturation that can copolymerize with methyl methacrylate.

These monomers are well known and mention may be made, in particular of acrylic and methacrylic acids and alkyl-(meth)acrylates in which the alkyl group has from 1 to 12 carbon atoms. As examples, mention may be made of methyl acrylate and ethyl, butyl or 2-ethylhexyl (meth)acrylate. Preferably the comonomer is an alkyl acrylate in which the alkyl group having from 1 to 4 carbon atoms.

According to the first more preferred embodiment the copolymer of methyl methacrylate (MMA) comprises from 80% to 99.8% advantageously from 90% to 99.7% and more advantageously from 90% to 99.5% by weight of methyl methacrylate and from 0.2% to 20% advantageously from 0.3% to 10% and more advantageously from 0.5% to 10% by weight of at least one monomer having at least one ethylenic unsaturation that can copolymerize with methyl methacrylate. Preferably the comonomer is chosen from methyl acrylate or ethyl acrylate or mixtures thereof.

The (meth)acrylic polymer AP1 has a melt flow index (MFI) according to ISO 1133 (230° C./3.8 kg) between 0.1 g/10 min and 20 g/10 min. Preferably melt flow index is between 0.2 g/10 min and 18 g/10 min, more preferably between 0.3 g/10 min and 16 g/10 min, advantageously between 0.4 g/10 min and 13 g/10 min.

The (meth)acrylic polymer AP1 has a refractive index between 1.46- and 1.52, preferably between 1.47 and 1.52 and more preferably between 1.48 and 1.52.

The (meth)acrylic polymer AP1 has a light transmittance according to ASTM D-1003 (sheet of 3 mm thickness) of at least 85%, preferably 86%, more preferably 87%.

The (meth) acrylic polymer AP1 has a Vicat softening temperature of at least 90° C. The Vicat softening temperature is measured according to ISO 306:2013 (B50 method).

The composition according to the invention can comprise beside the (meth)acrylic polymer AP1 also an (meth)acrylic polymer AP2. The (meth)acrylic polymer AP1 and (meth)acrylic polymer AP2 form a mixture or a blend. This mixture or blend consists of at least one homopolymer and at least one copolymer of MMA, or a mixture of at least two homopolymers or two copolymers of MMA with a different average molecular weight or a mixture of at least two copolymers of MMA with a different monomer composition.

The (meth)acrylic polymer composition MP1 can optionally been impact modified.

The (meth)acrylic polymer composition MP1 can be transformed by extrusion or injection molding in form of a sheet The crosslinked (meth) acrylic composition MCX comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol.

In a specific embodiment the polymeric composition PC1 of the invention, it comprises a crosslinked (meth) acrylic composition MCX consisting of a brittle matrix (I) having a glass transition temperature Tg of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol.

As regards the matrix (I), it exhibits an overall Tg of greater than 0° C., measured by differential scanning calorimetry (DSC), and is compatible with the methyl methacrylate homo- or copolymer. Preferably glass transition temperature Tg is greater than 10° C., more preferably greater than 20° C., still more preferably greater than 40° C. even more preferably greater than 40° C., advantageously greater than 50° C. and more advantageously greater than 60° C.

The matrix (I) is prepared from methyl methacrylate and optionally one or more monomer(s) MO1 chosen from:
acrylic monomers of formula $CH_2=CH-C(=O)-O-R_1$, where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, acrylic acid, methyl acrylate, ethyl acrylate, propyl acrylate, n-butyl acrylate, isobutyl acrylate, tert-butyl acrylate, 2-ethylhexyl acrylate, glycidyl acrylate, hydroxyalkyl acrylates or acrylonitrile;
methacrylic monomers of formula $CH_2=C(CH_3)-C(=O)-O-R_2$, where $R_2$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates or methacrylonitrile;
vinylaromatic monomers, such as, for example, styrene or substituted styrenes, such as α-methylstyrene, monochlorostyrene or tert-butylstyrene.

The comonomer(s) are chosen in nature and quantity that the lower limit of the glass transition temperature Tg is met.

Preferably methyl methacrylate is the predominant monomer in the polymer of the matrix (I). The matrix (I) thus includes a proportion of methyl methacrylate of from 51 wt % to 100 wt %, preferably between 75 wt % and 100 wt % and advantageously between 90 wt % and 100 wt %.

As regards the macromolecular sequences (II) having a flexible nature, said macromolecular sequences (II) they are also called block B in the present invention. These macromolecular sequences (II) having a flexible nature exhibit a glass transition temperature of less than 0° C. (denoted Tg and measured by DSC). Preferably the Tg is less than −5° C., more preferably less than −10° C. and even more preferably less than −15° C.

Furthermore, the weight-average molecular weight of the macromolecular sequences (II) having a flexible nature with a glass transition temperature of less than 0° C. is between 150 000 g/mol and 800 000 g/mol.

Preferably the weight-average molecular weight of the macromolecular sequences (II) having a flexible nature with a glass transition temperature of less than 0° C. is between 175 000 and 700 000 g/mol, more preferably between 200 000 g/mol and 650 000 g/mol, and advantageously between 225 000 g/mol and 600 000 g/mol.

The polydispersity index of the molecular weight Mw/Mn of the macromolecular sequences (II) having a flexible nature or block B is greater than 2, preferably greater than 2.5 and more preferably greater than 3.

The polydispersity index of the molecular weight Mw/Mn of the macromolecular sequences (II) having a flexible nature or block B is between 2.5 and 10.0, preferably between 3.0 and 10.0, more preferably between 3.0 and 6.0 and even more preferably between 3.0 and 5.0.

The macromolecular sequences (II) are prepared from one or more monomer(s) MO2 chosen from:

acrylic monomers of formula $CH_2=CH-C(=O)-O-R_1$, where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, acrylic acid, methyl acrylate, ethyl acrylate, propyl acrylate, n-butyl acrylate, isobutyl acrylate, tert-butyl acrylate, 2-ethylhexyl acrylate, glycidyl acrylate, hydroxyalkyl acrylates or acrylonitrile;

methacrylic monomers of formula $CH_2=C(CH_3)-C(=O)-O-R_2$, where $R_2$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates or methacrylonitrile;

vinylaromatic monomers, such as, for example, styrene or substituted styrenes, α-methylstyrene, monochlorostyrene or tert-butylstyrene.

The macromolecular sequences (II) are not prepared from a diene. A person skilled in the art knows how to combine these monomers so as to adjust:

the entire Tg of the block B. In order to obtain a block B with a Tg of less than 0° C., it is necessary to use at least one monomer exhibiting a Tg of less than 0° C., for example butyl acrylate or 2-ethylhexyl acrylate;

the refractive index of the block B, which has to be as close as possible to that of the matrix (I) in order to provide the best possible transparency when the transparency is required for the targeted application.

The macromolecular sequences (II) can be composed solely of a monomer exhibiting a Tg of less than 0° C. (once the monomer has been polymerized), for example butyl acrylate or 2-ethylhexyl acrylate. The macromolecular sequences (II) can also be composed of at least one alkyl acrylate and of a vinylaromatic monomer. Advantageously, the macromolecular sequences (II) are composed of butyl acrylate and styrene in the butyl acrylate/styrene ratio by weight of between 70/30 and 90/10, preferably between 75/25 and 85/15.

In a first preferred embodiment, the macromolecular sequences (II) are not crosslinked. The one or more monomer(s) MO2 for preparing the macromolecular sequences (II) comprises no monomers with two double bonds that are polymerizable.

The content of block B (the macromolecular sequences (II)) in the polymeric composition is between 1 wt % and 30% by weight, preferably between 2 wt % and 20% by weight more preferably 2 wt % to 15 wt %, with respect to the polymeric composition comprising crosslinked (meth) acrylic composition and macromolecular sequences (II).

As regards the compounds which make the crosslinking possible (the crosslinking agent), they are preferably polyfunctional acrylic monomers, such as, for example, polyol polyacrylates, alkylene glycol polyacrylates or allyl acrylate, ethylene glycol diacrylate, 1,3-butylene glycol diacrylate or 1,4-butylene glycol diacrylate, polyfunctional methacrylic monomers, such as polyol polymethacrylates, alkylene glycol polymethacrylates or allyl methacrylate, ethylene glycol dimethacrylate, 1,3-butylene glycol dimethacrylate or 1,4-butylene glycol dimethacrylate, divinylbenzene or trivinylbenzene. In a first preferred embodiment it is 1,4-butylene glycol dimethacrylate (BDMA).

The content of crosslinking agent is between 0.05% and 10% by weight, with respect to the MMA and the monomer MO1 of crosslinked acrylic composition, which are a subject matter of the invention.

Preferably, the content of crosslinking agent is between 0.4% and 8% by weight, with respect to the to the MMA and the monomer MO1 of the crosslinked acrylic composition which are a subject matter of the invention, and more preferably between 0.5% and 5% by weight, even more preferably between 1 wt % and 5 wt %.

The composition according to the invention possesses a swelling index of less than 200% in acetone at 20° C., preferably less than 190%, even more preferably less than 180% and most preferably less than 175%.

The composition according to the invention possesses a swelling index of between 0% and 200% in acetone at 20° C., preferably between 0 and 190%, even more preferably between 0% and 180% and most preferably between 0% and 175%.

The polymeric composition PC1 comprising the crosslinked (meth) acrylic composition as transparent polymer TP1 according to the invention is preferably in form of a sheet. Preferably it is a cast sheet. The sheet can be a flat sheet or a non-flat sheet. A non-flat sheet can be obtained by example by first making a flat sheet and then thermoforming this flat sheet in order to obtain a non-flat sheet in form of a slightly curved sheet.

Thickness of the sheet is between 1 mm and 50 mm, preferably the thickness is between 1 mm and 45 mm, more preferably between 1 and 40 mm, even more preferably between 1 mm and 35 mm, advantageously between 2 mm and 35 mm.

The content of block B (the macromolecular sequences (II)) in the sheet is between 1% and 30% by weight, preferably between 2% and 20% by weight, weight more preferably 2 wt % to 15 wt %, with respect to the polymeric composition comprising crosslinked (meth)acrylic composition and macromolecular sequences (II).

With regard to the process for manufacturing the the polymeric composition PC1 comprising a crosslinked (meth)acrylic composition as transparent polymer TP1 comprising or consisting of a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol, said process comprises the steps of
a) preparing the macromolecular sequences (II)
b) mixing the macromolecular sequences (II) of step a) with methyl methacrylate, and optionally a crosslinking agent, optionally at least one comonomer MO1 and optionally at least one radical initiator;
c) mixing the composition comprising the macromolecular sequences (II) and methyl methacrylate with crosslinking agent, optionally at least one comonomer MO1 and at least one radical initiator, if it has not been done yet in step b);
d) casting the mixture obtained in previous step in a mold and then heating it according to a temperature cycle in order to obtain a cast sheet.

According to a first preferred embodiment of the process of the invention, for manufacturing the the polymeric composition PC1 comprising the crosslinked (meth) acrylic composition as transparent polymer TP1, the process is a preparation of cast sheets made of methyl methacrylate homo- or copolymer which are impact-reinforced using the macromolecular sequences (II) comprises the following steps:
a) preparing the macromolecular sequences (II) by mixing, with the monomer(s) intended to form the macromolecular sequences (II), an alkoxyamine of general formula $Z(-T)_n$, in which Z denotes a polyvalent group, T denotes a nitroxide and n is an integer greater than or equal to 1;
b) mixing the macromolecular sequences (II) of step a) with methyl methacrylate, and optionally a crosslinking agent, optionally at least one comonomer MO1 and optionally at least one radical initiator;
c) mixing the composition comprising the macromolecular sequences (II) and methyl methacrylate with crosslinking agent, optionally at least one comonomer MO1 and at least one radical initiator, if it has not been done yet in step b);
d) casting the mixture obtained in previous step in a mold and then heating it according to a temperature cycle in order to obtain a cast sheet.

According to a second preferred embodiment of the process of the invention, for manufacturing the the polymeric composition PC1 comprising the crosslinked (meth) acrylic composition as transparent polymer TP1, the process is a preparation of cast sheets made of methyl methacrylate homo- or copolymer which are impact-reinforced using the macromolecular sequences (II) comprises the following steps:
a) preparing the macromolecular sequences (II) by mixing, with the monomer(s) intended to form the macromolecular sequences (II), an alkoxyamine of general formula $Z(-T)_n$, in which Z denotes a polyvalent group, T denotes a nitroxide and n is an integer greater than or equal to 1;
b1) mixing the macromolecular sequences (II) of step a) with methyl methacrylate;
b2) partly polymerizing the mixture of the macromolecular sequences (II) and methyl methacrylate and adding optionally additional methyl methacrylate
c) mixing the composition partly polymerized with crosslinking agent, optionally at least one comonomer MO1 and at least one radical initiator;
d) casting the mixture obtained in previous step in a mold and then heating it according to a temperature cycle in order to obtain a cast sheet.

According to a third preferred embodiment of the process of the invention, for manufacturing the the polymeric composition PC1 comprising the crosslinked (meth) acrylic composition as transparent polymer TP1, the process is a preparation of cast sheets made of methyl methacrylate homo- or copolymer which are impact-reinforced using the macromolecular sequences (II) comprises the following steps:
a1) preparing an alkoxyamine of general formula $Z(-T)_n$, in which Z denotes a polyvalent group, T denotes a nitroxide and n is an integer greater than or equal to 1;
a2) preparing the macromolecular sequences (II) by mixing, with the monomer(s) intended to form the macromolecular sequences (II) with the alkoxyamine of a1);
b1) mixing the macromolecular sequences (II) of step a2) with methyl methacrylate;
b2) partly polymerizing the mixture of the macromolecular sequences (II) and methyl methacrylate and adding optionally additional methyl methacrylate
c) mixing the composition partly polymerized with crosslinking agent, optionally at least one comonomer MO1 and at least one radical initiator;
d) casting the mixture obtained in previous step in a mold and then heating it according to a temperature cycle in order to obtain a cast sheet.

The crosslinking agent and the comonomer MO1 are the same as defined before.

With regards to alkoxyamine, it can be any type of alkoxyamine. It may also be a poly-alkoxyamine, which is capable of generating several nitroxide radicals, or alternatively a macromolecular alkoxyamine or macromolecular poly-alkoxyamine derived from a step of polymerization between at least one monomer and an alkoxyamine.

Thus, according to a first embodiment of the invention, at least one of the alkoxyamines is monofunctional.

According to a second form of the invention, at least one of the alkoxyamines is multifunctional.

The alkoxyamine or the poly-alkoxyamine is described by the general formula $Z(-T)_n$ in which Z denotes a multivalent group, T a nitroxide and n an integer greater than or equal to 1, preferably from 2 to 10, advantageously from 2 to 8 and more preferably from 2 to 4, limits inclusive.

n represents the functionality of the alkoxyamine, i.e. the number of nitroxide radicals T that can be released by the alkoxyamine according to the mechanism:

$$Z(-T)_n \rightleftharpoons Z + n\,T$$

This reaction is activated is activated by the temperature. In the presence of monomer(s), the activated alkoxyamine initiates a polymerization. The scheme below illustrates the preparation of a copolymer polyM2-polyM1-polyM2 based on an alkoxyamine for which n=2. The monomer M1 is first polymerized after activation of the alkoxyamine, and, once the block polyM1 is complete, the monomer M2 is then polymerized:

$$T-Z-T \xrightarrow{M_1} T-(M_1)_x-Z-(M_1)_x-T \xrightarrow{M_2}$$

-continued

The principle of the preparation of block copolymers remains valid for n greater than or equal to 1.

Z denotes a multivalent group, i.e. a group that can release several radical sites after activation. The activation in question takes place by cleavage of the covalent bond Z-T.

By way of example, Z may be chosen from groups (I) to (VIII) below:

(I)

in which $R_3$ and $R_4$, which may be identical or different, represent a linear or branched alkyl radical containing a number of carbon atoms ranging from 1 to 10, phenyl or thienyl radicals optionally substituted with a halogen atom such as F, Cl or Br, or alternatively with a linear or branched alkyl radical containing a number of carbon atoms ranging from 1 to 4, or alternatively with nitro, alkoxy, aryloxy, carbonyl or carboxyl radicals; a benzyl radical, a cycloalkyl radical containing a number of carbon atoms ranging from 3 to 12, a radical comprising one or more unsaturations; B represents a linear or branched alkylene radical containing a number of carbon atoms ranging from 1 to 20; m is an integer ranging from 1 to 10;

(II)

in which $R_5$ and $R_6$, which may be identical or different, represent aryl, pyridyl, furyl or thienyl radicals optionally substituted with a halogen atom such as F, Cl or Br, or alternatively with a linear or branched alkyl radical containing a number of carbon atoms ranging from 1 to 4, or alternatively with nitro, alkoxy, aryloxy, carbonyl or carboxyl radicals; D represents a linear or branched alkylene radical containing a number of carbon atoms ranging from 1 to 6, a phenylene radical or a cycloalkylene radical; p is an integer ranging from 1 to 10;

(III)

in which $R_7$, $R_8$ and $R_9$, which may be identical or different, have the same meanings as $R_3$ and $R_4$ of formula (I), q, r and s are integers ranging from 1 to 10;

(IV)

in which $R_{10}$ has the same meaning as $R_5$ and $R_6$ of formula (II), t is an integer ranging from 1 to 4, u is an integer between 2 and 6 (the aromatic group is substituted);

(V)

in which $R_{11}$ has the same meaning as the radical $R_{10}$ of formula (IV) and v is an integer between 2 and 6;

(VI)

in which $R_{12}$, $R_{13}$ and $R_{14}$, which may be identical or different, represent a phenyl radical, optionally substituted with a halogen atom such as Cl or Br, or alternatively with a linear or branched alkyl radical, containing a number of carbon atoms ranging from 1 to 10; W represents an oxygen, sulfur or selenium atom, w is equal to 0 or 1;

(VII)

in which $R_{15}$ has the same meaning as $R_3$ of formula (I), $R_{16}$ has the same meaning as $R_5$ or $R_6$ of formula (II);

(VIII)

in which $R_{17}$ and $R_{18}$, which may be identical or different, represent a hydrogen atom or a linear or branched alkyl radical containing a number of carbon atoms ranging from 1 to 10, an aryl radical, optionally substituted with a halogen atom or a heteroatom.

T denotes a nitroxide, which is a stable free radical bearing a group —N—O., i.e. a group on which an unpaired electron is present. The term "stable free radical" denotes a radical that is so persistent and unreactive toward atmospheric air and moisture that it can be handled and stored for a much longer time than the majority of free radicals (see in this respect *Accounts of Chemical Research* 1976, 9, 13-19). The stable free radical thus differs from free radicals whose lifetime is fleeting (from a few milliseconds to a few seconds) such as free radicals derived from the usual polymerization initiators, for instance peroxides, hydroperoxides or azo initiators. A free radical may be said to be stable if it is not a polymerization initiator and if the average lifetime of the radical is at least one minute.

T is represented by the structure:

(IX)

in which $R_{19}$, $R_{20}$, $R_{21}$, $R_{22}$, $R_{23}$ and $R_{24}$ denote groups from among:

linear or branched $C_1$-$C_{20}$ and preferably $C_1$-$C_{10}$ alkyls such as substituted or unsubstituted methyl, ethyl, propyl, butyl, isopropyl, isobutyl, tert-butyl or neopentyl, substituted or unsubstituted $C_6$-$C_{30}$ aryls such as benzyl or aryl (phenyl)

saturated $C_1$-$C_{30}$ cyclics and in which the groups $R_{19}$ and $R_{22}$ may form part of an optionally substituted cyclic structure $R_{19}$—CNC—$R_{22}$ which may be chosen from:

in which x denotes an integer between 1 and 12.

By way of example, use may be made of the following nitroxides:

The nitroxides of formula (X) are particularly preferably used:

(X)

$R_a$ and $R_b$ denoting identical or different alkyl groups bearing from 1 to 40 carbon atoms, optionally linked together so as to form a ring and optionally substituted with hydroxyl, alkoxy or amino groups, $R_L$ denoting a monovalent group with a molar mass of greater than 15.42 g/mol and preferably greater than 30 g/mol. The group $R_L$ may have, for example, a molar mass of between 40 and 450 g/mol. It is preferably a phosphorus-bearing group of general formula (XI):

(XI)

in which X and Y, which may be identical or different, may be chosen from alkyl, cycloalkyl, alkoxyl, aryloxyl, aryl, aralkyloxyl, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula:

(XII)

in which $R_c$ and $R_d$ are two identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, with one or more alkyl radicals comprising from 1 to 10 carbon atoms.

The nitroxides of formula (X) are preferred since they make it possible to obtain good control of the radical polymerization of the (meth)acrylic monomers, as is taught in WO 03/062 293. The alkoxyamines of formula (XIII) bearing a nitroxide of formula (X) are thus preferred:

(XIII)

in which:

Z denotes a multivalent group;

$R_a$ and $R_b$ denote identical or different alkyl groups bearing from 1 to 40 carbon atoms, optionally linked together so as to form a ring and optionally substituted with hydroxyl, alkoxy or amino groups;

$R_L$ denotes a monovalent group with a molar mass of greater than 15.042 g/mol and preferably greater than 30 g/mol. The group $R_L$ may have, for example, a molar mass of between 40 and 450 g/mol. It is preferably a phosphorus-bearing group of general formula (XI):

(XI)

in which X and Y, which may be identical or different, may be chosen from alkyl, cycloalkyl, alkoxyl, aryloxyl, aryl, aralkyloxyl, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula:

(XII)

in which $R_c$ and $R_d$ are two identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, with one or more alkyl radicals comprising from 1 to 10 carbon atoms.

By way of example of nitroxide of formula (X) that may be borne by the alkoxyamine (XIII), mention may be made of:

N-tert-butyl-1-phenyl-2-methylpropyl nitroxide,

N-(2-hydroxymethylpropyl)-1-phenyl-2-methylpropyl nitroxide,

N-tert-butyl-1-dibenzylphosphono-2,2-dimethylpropyl nitroxide,

N-tert-butyl-1-bis(2,2,2-trifluoroethyl)phosphono-2,2-dimethylpropyl nitroxide,

N-tert-butyl[(1-diethylphosphono)-2-methylpropyl] nitroxide,

N-(1-methylethyl)-1-cyclohexyl-1-(diethylphosphono) nitroxide,

N-(1-phenylbenzyl)-[(1-diethylphosphono)-1-methylethyl]nitroxide,

N-phenyl-1-diethylphosphono-2,2-dimethylpropyl nitroxide,

N-phenyl-1-diethylphosphono-1-methylethyl nitroxide,

N-(1-phenyl-2-methylpropyl)-1-diethylphosphonomethylethyl nitroxide, or alternatively the nitroxide of formula:

The nitroxide of formula (XIV) is particularly preferred:

(XIV)

It is N-tert-butyl-1-diethylphosphono-2,2-dimethylpropyl nitroxide, commonly known for simplicity as SG1.

The alkoxyamine (I), and especially the alkoxyamine (XIII), may be prepared via recipes described, for example, in FR 2 791 979. One method that may be used consists in coupling a carbon-based radical with a nitroxide. The coupling may be performed starting with a halogenated derivative in the presence of an organometallic system such as CuX/ligand (X=Cl or Br) according to a reaction of ATRA (atom-transfer radical addition) type as described by D. Greszta et al. in *Macromolecules* 1996, 29, 7661-7670.

Alkoxyamines that may be used in the context of the invention are represented below:

DIAMS

-continued

-continued

DIAMINS

TRIAMINS

The last two alkoxyamines are called DIAMINS and TRIAMINS, respectively, and are the preferred alkoxyamines.

Advantageously the alkoxyamine called TRIAMINS is chosen for the process according to the invention.

With regards to the step b1) of mixing the macromolecular sequences (II) of step a) with methyl methacrylate, it is made that the macromolecular sequences (II) presents between 30 wt % and 60 wt % preferably between 35 wt % and 55 wt % of the mixture comprising the macromolecular sequences (II) and the methyl methacrylate.

With regards to the step b2) of partly polymerizing the mixture of the macromolecular sequences (II) and methyl methacrylate, it is done by heating the mixture. The mixture is heated to a temperature above 60° C., preferably 70° C. The mixture is heated to a temperature less than 100° C. preferably less than 90° C. The polymerization is stopped when the partly polymerized mixture is having a viscosity between 100 cPoisse and 5000 cPoise at 20° C. as measures with a Brookfield viscosimeter. The polymerization is stopped by adding methyl methacrylate having a temperature below 20° C., preferably below 10° C. The quantity of the added methyl methacrylate is chosen to obtain a liquid mixture having between 2 wt % and 30 wt % of macromolecular sequences (II) in the mixture.

With regards to the radical initiator, it can be chosen from diacyl peroxides, peroxyesters, dialkyl peroxides, peroxyacetals or azo compounds. Radical initiators which may be suitable are, for example, isopropyl carbonate, benzoyl peroxide, lauroyl peroxide, caproyl peroxide, dicumyl peroxide, tert-butyl perbenzoate, tert-butyl per-2-ethylhexanoate, cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, 1,1-di(t-amylperoxy)cyclohexane, tert-butyl peroctoate, azodiisobutyronitrile (AIBN), azodiisobutyramide, 2,2'-azobis(2,4-dimethylvaleronitrile), 4,4'-azobis(4-cyano-pentanoic acid) or 1,1'-azobis(cyanocyclohexane). It would not be departing from the scope of the invention to use a mixture of radical initiators chosen from the above list.

The content of radical initiator with respect to the monomers of the mixture which is cast in the mold varies from 100 to 2000 ppm by weight, preferably between 200 and 1000 ppm by weight. This content can vary as a function of the application and of the thickness targeted.

The polymeric composition PC1 can comprise also other compounds, which are not taken into account for the calculation of the weight ratios between the compounds mentioned before.

Other ingredients can be optionally added to the mixture which is cast in the mold. Mention may be made, without implied limitation, of:
- colored organic dyes or colored inorganic pigments;
- plasticizers;
- UV-stabilizing additives, such as Tinuvin P from Ciba, used at contents of 0 to 1000 ppm and preferably 50 to 500 ppm, with respect to the mixture which is cast in the mold;
- light or heat stabilizers, such as, for example, Tinuvin 770;
- antioxidants;
- flame-retarding additives, such as, for example, tris(2-chloropropyl) phosphate;
- thickening agents, such as, for example, cellulose acetate butyrate;
- mold-release agents, such as, for example, dioctyl sodium sulfosuccinate, used at contents of 0 to 500 ppm and preferably 0 to 200 ppm, with respect to the mixture which is cast in the mold.

The sheet of the polymeric composition PC1 according to the invention or made by the process according to the invention can at least on one surface be coated with varnish. The varnish is preferably transparent.

The sheet of the polymeric composition PC1 according to the invention or made by the process according to the invention can be used as monolithic sheet or in a multilayer structure.

The multilayer structure comprises the sheet of or with the polymeric composition PC1 according to the invention as one layer. The layer could be an external layer or an internal layer.

The other layers of the multilayer structure beside the layer made of the sheet with the polymeric composition PC1 according to the invention, can be polymer layers.

One surface of the sheet according to the invention can be at least partially grained. Preferably this is the surface in contact with the water during use.

Still another aspect of the present invention is the use of the polymeric composition PC1 according to the invention.

The polymeric composition PC1 according to the invention is preferably used in nautical applications or watercrafts. The watercraft can comprise the polymeric composition PC1 or the watercraft can be made nearly entirely out of the polymeric composition PC1.

The nautical application can comprise the polymeric composition PC1 or the nautical object can be made nearly entirely out of the polymeric composition PC1

The polymeric composition PC1 is the same as described before.

Still another aspect of the present invention is an object in form of a watercraft or a nautical object that is large parts transparent.

The watercraft according to the invention, may be a stand-up paddle, a surfboard, a wind surfboard, a body board, a kite board, a kayak, a jet ski, a multihull vessel with at least two floaters (as a catamaran or a trimaran), a boat or another watercraft.

The watercraft according to the invention, may be a device for watersports.

The nautical application concerns a nautical object that is used or floats on or in or under water.

The nautical object according to the invention may be a mask for snorkelling or helmet for diving or a protection cage for underwater or the like. The nautical object can also be a floating house or a houseboat or a landing stage or a floating observation platform.

The watercraft or nautical object is at least partly transparent, preferably a large part of the watercraft or nautical object is transparent. The transparency concerns especially that part or surface of the watercraft or nautical object that is in direct contact with the water.

That means for a watercraft the downside and the upside of this part or surface, where usually the downside is under water and in contact with the water and the upside is the opposite side to the downside. The upside can also be under the water surface, but not in direct contact with the water (is for example the bottom in the inside of a boat), or the upside can be submerged by water as the upside of a surfboard.

For a boat it can also be a large side viewing window.

Concerning the part or surface of the watercraft or nautical object in direct contact with the water, when the watercraft or nautical object is in the water, at least 10% of this part or surface is transparent. Preferably at least 20% of the part or the surface of the watercraft in direct contact with the water is transparent, more preferably at least 30%, even more preferably at least 40% advantageously at least 50% and most advantageously at least 75%.

FIGS. 1c) and 1d) shows a surfboard which is entirely or that is in large part transparent. The non-transparent parts might there to fix parts required on the surfboard, as fixtures for mast and sails, leg rope, fins or bindings.

More preferably between 10% and 100% of the part or surface of the watercraft in direct contact with the water is transparent, even more preferably between 20% and 100%, still more preferably between 30% and 100%, even still more preferably between 40% and 100%, advantageously between 50% and 100% and most advantageously between 75% and 100%.

Figure 1:
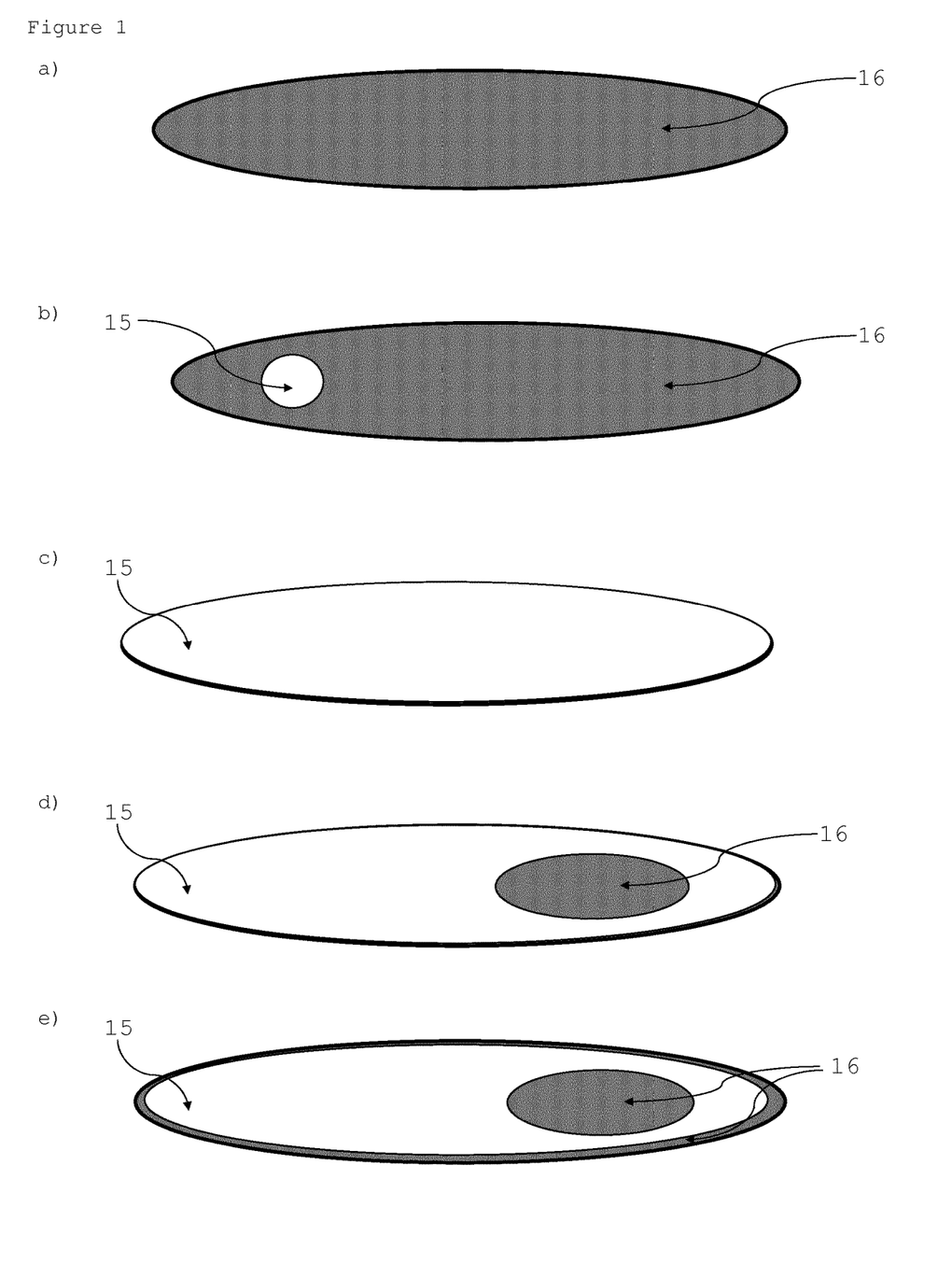
FIG. 1 shows different surfboard either according to prior art or according to the invention. The grey part signifies a non-transparent part or surface and the white part a transparent surface.
Figure 2:
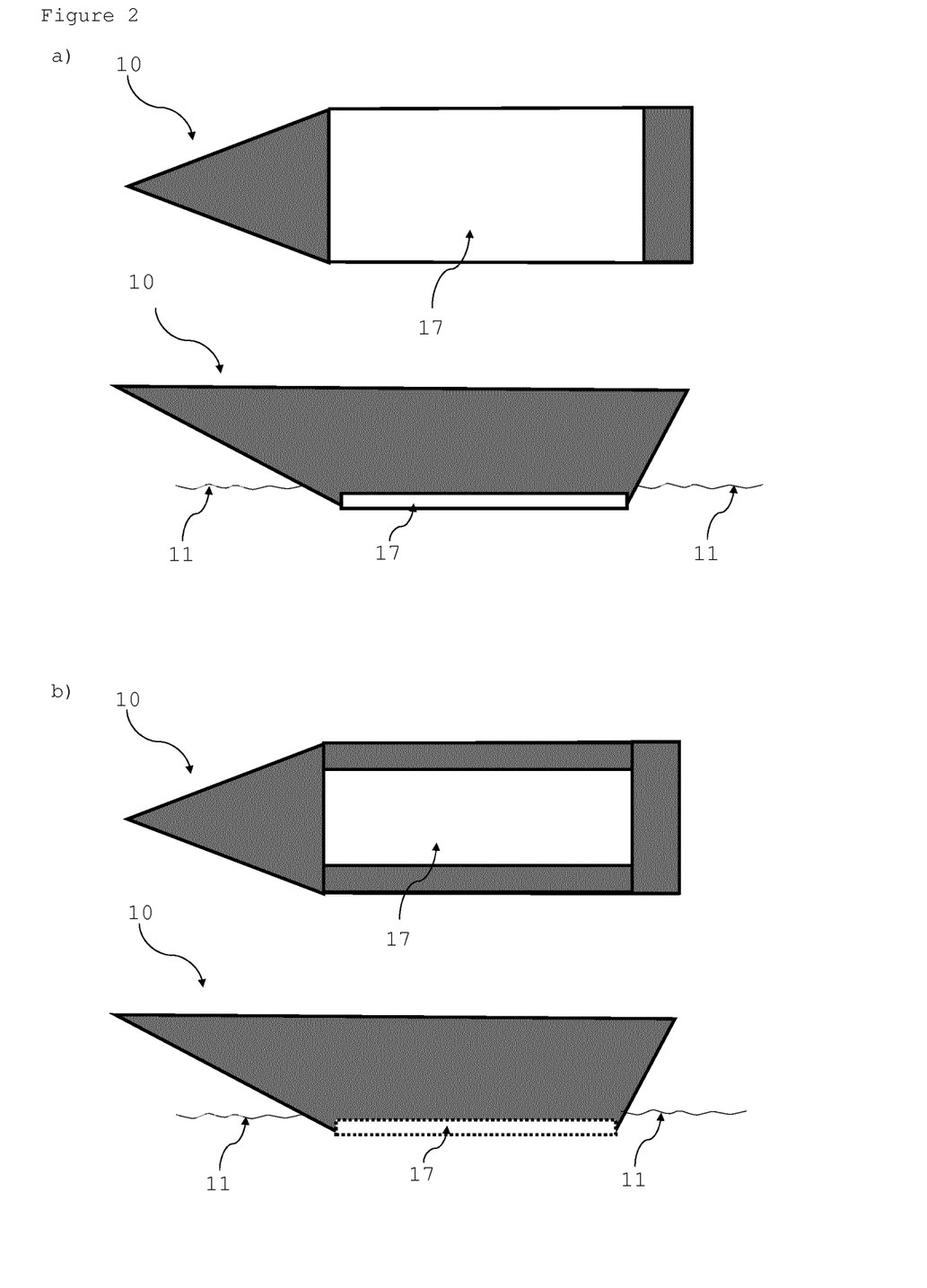
FIG. 2 shows a top view and side view of boat as watercraft (10) with a transparent bottom viewing window (17).

This is shown in FIGS. 1 and 2. In FIG. 1 c) to e) a large part of or nearly the entire surface of the watercraft is transparent. In FIG. 2 a large part of the entire surface (17) of the watercraft that is under water surface (11) is transparent.

In a first preferred embodiment the watercraft is a stand-up paddle.

In a second preferred embodiment the watercraft is a surfboard. The surfboard can be a longboard, a shortboard, a kneeboard, a bodyboard, a wakeboard or a kiteboard.

Figure 3A:
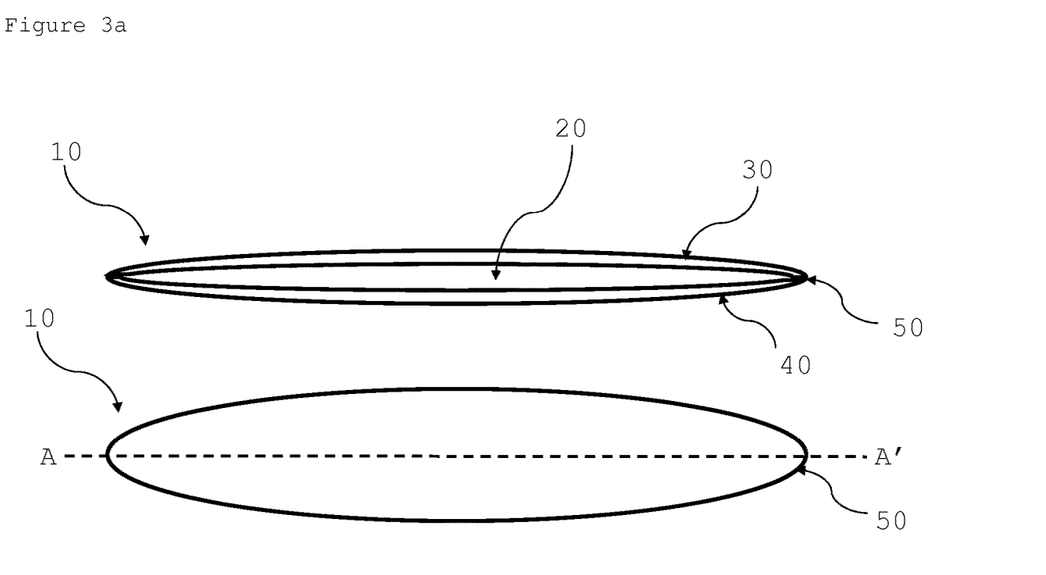
FIGS. 3a and 3b show a surf board as watercraft (10) made essentially of a polymeric composition according to the invention in side view (lower part of FIGS. 3a and 3b) along the axis A-A' and down view (upper part of FIGS. 3a and 3b).

Preferably the watercraft (10) and more preferably the watercraft (10) according to the first and second preferred embodiment comprises a cavity (20). Such a cavity (20) is shown in FIG. 3a. The cavity (20) has a volume of at least 10 cm$^3$. The cavity (20) has a volume of at most 100 m$^3$. Preferably the cavity (20) has a volume of at least 100 cm$^3$, more preferably of at least 1000 cm$^3$, even more preferably of at least 2000 cm$^3$ and advantageously of at least 3000 cm$^3$. Preferably the cavity has a volume of at most 80 m$^3$, more preferably of at most 50 m$^3$, still more preferably of at most 20 m$^3$ and advantageously of at most 10 m$^3$.

More preferably the cavity (20) of the watercraft (10) according to the first and second preferred embodiment has a volume between 100 cm$^3$ and 100 m$^3$, advantageously between 1000 cm$^3$ and 10 m$^3$, more advantageously between 1000 cm$^3$ and 1 m$^3$ and even more advantageously between 2000 cm$^3$ and 0.5 m$^3$.

Figure 3B:
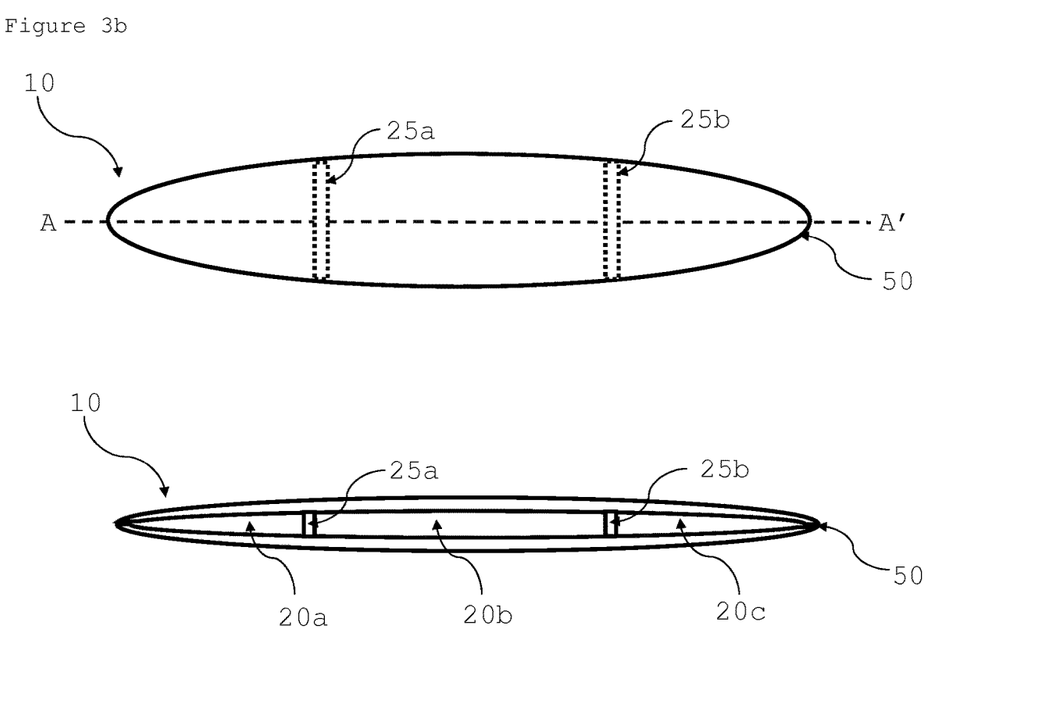
Figure 4:
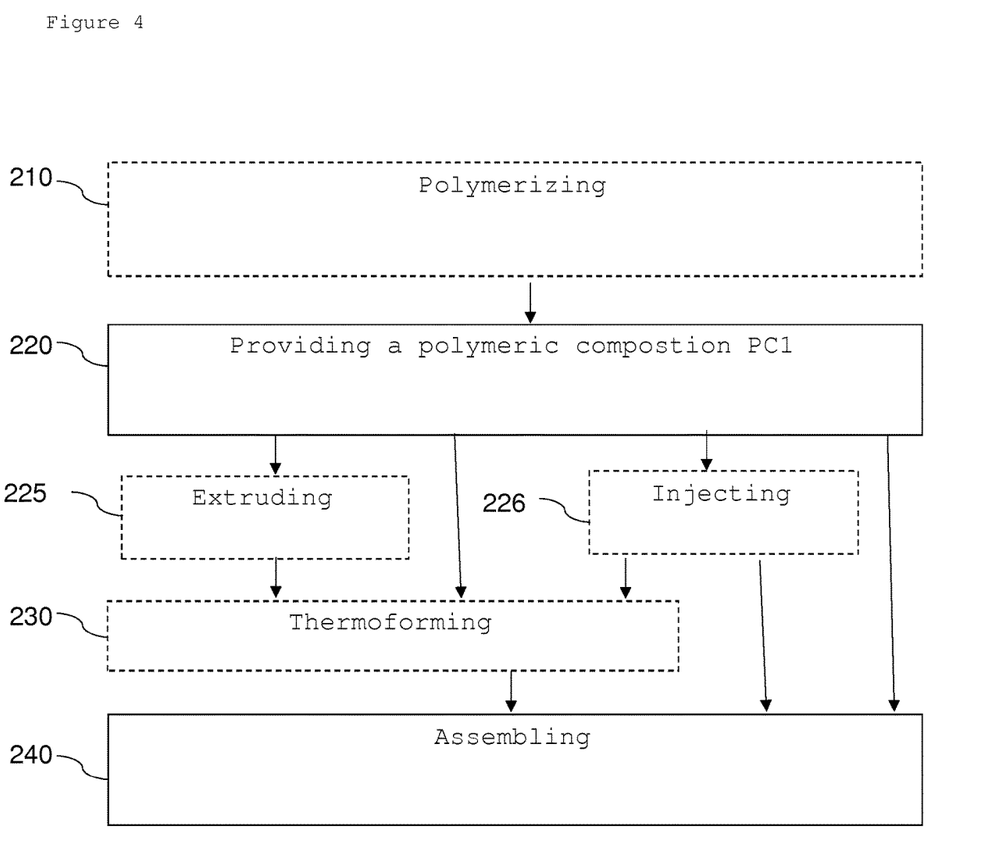
FIG. 4 shows the schematic process steps for making one embodiment of a watercraft (10) with essential steps (220) and (240) and optional steps (210), (225), (226) and (230).

The cavity (20) does not consist of microspores that make up the volume of the cavity (20). Nevertheless the complete volume of the cavity (20) may be consisting of several divided smaller cavities (20a to 20n). The added volume of these respective smaller cavities make up the complete volume of the cavity (20). FIG. 3b shows of an example of a watercraft (10) in form of a surfboard comprising three smaller cavities (20a, 20b and 20c). The smaller cavities (20a, 20b and 20c) are separated by walls (25a and 25b). The walls between the respective cavities can be made out of the thermoplastic composition PC1, but it can also be another material. The walls can be tightly sealed so that no material go pass the wall going from one smaller cavity to another cavity. The walls can also be not sealed, for example having holes, so that material can go from one smaller cavity to another cavity. These three smaller cavities (20a, 20b and 20c) add up to the global cavity of the watercraft (10).

The watercraft can comprise at least one lightning device. Preferably the lightning device projects the light through the downside of the watercraft into the water. The lighting device comprises at least one light source. The light source for example can be a LED. The LED might be white or colored.

Still another aspect of the present invention is process for making a watercraft or nautical object that comprises a polymeric composition PC1, said process comprises the steps of
a) providing a polymeric composition PC1
b) assembling the polymeric composition PC1

The polymeric composition PC1 and all their variations is the same as described before.

The assembling means the assembling of the polymeric composition PC1 for watercraft or nautical object during the process.

The process comprises principally the two following steps:
a) providing 220 a polymeric composition PC1
b) assembling 240 the polymeric composition PC1

The process can comprise the optional additional steps, depending on the form of the provided polymeric composition PC1.

If the provided polymeric composition PC1 has the form required for the assembling, it can be directly assembled.

The process can comprise the additional step of thermoforming 230 the polymeric composition PC1. The thermoforming can may be required the change the form of the provided polymeric composition PC1. For example changing from a flat sheet to a curved sheet.

The process can comprise the additional step of extruding 225, for transforming the provided polymeric composition PC1. For example extruding granules of provided polymeric composition PC1 to a flat sheet.

The process can comprise the additional step of injecting 226, for transforming the provided polymeric composition PC1. For example injecting granules of provided polymeric composition PC1 to a sheet. The sheet can have already the form required for the assembling, so that it can be directly assembled or the sheet is flat and is thermoformed for obtaining the required form for assembling.

The process can comprise the optional additional step of polymerizing 210.

In a first preferred embodiment the polymeric composition PC1 is provided in form of a sheet. The sheet has a preferably a thickness from 1 to 30 mm, more preferably from 2 to 20 mm The assembling of the polymeric composition is made for example by bonding with an adhesive or by welding or by thermo compressing.

Preferably the assembling step is made is made with the sheets described before.

FIG. 3a shows a watercraft (10) in form of a surfboard made out of two thermoformed sheets (30 and 40) and assembled together at line (50). One of the sheets (30 and 40) forms the upper side and one the lower side, latter which is in constant contact with water. Between the two assembled sheets (30 and 40) is the cavity (20).

The invention claimed is:

1. A watercraft or nautical object, a portion of which is transparent, comprising a polymeric composition PC1 comprising a transparent polymer TP1, wherein the transparent polymer TP1 is a (meth) acrylic block copolymer MBC, a (meth) acrylic polymer composition MP1, a crosslinked (meth) acrylic composition MCX, or blends thereof,
   wherein the crosslinked (meth) acrylic composition MCX comprises:
   a brittle matrix (I) having a glass transition temperature of greater than 0° C. and elastomeric domains having a dimension of less than 100 nm consisting of macromolecular sequences (II) having a flexible nature with a glass transition temperature of less than 0° C., wherein the macromolecular sequences (II) are flexible and have a weight average molecular weight Mw of between 200,000 and 650,000 g/mol;
   wherein the (meth) acrylic block copolymer MBC comprises at least one block where at least 50 wt % of the monomers inside the block are alkyl (meth) acrylate monomers that have been polymerized;
   wherein the macromolecular sequences comprise butyl acrylate and styrene in a ratio by weight of between 70/30 and 90/10, and wherein the nautical object is an object that floats on or in or under water.

2. The watercraft or nautical object according to claim 1, wherein the transparent polymer TP1 is a (meth)acrylic block copolymer MBC or a crosslinked (meth) acrylic composition MCX.

3. The watercraft or nautical object according to claim 1, wherein the (meth) acrylic block copolymer MBC has a general formula $(A)_nB$ in which:

n is an integer of greater than or equal to 1,

A is an acrylic or methacrylic homo- or copolymer having a Tg of greater than 50° C., or polystyrene, or an acrylic/styrene or methacrylic/styrene copolymer;

B is an acrylic or methacrylic homo- or copolymer having a Tg of less than 20° C., comprising monomers selected from the group consisting of methyl acrylate, ethyl acrylate, butyl acrylate (BuA), ethylhexyl acrylate, styrene (Sty) and butyl methacrylate, where the monomers make up at least 50 wt % of B.

4. The watercraft or nautical object according to claim 1, wherein the transparent polymer TP1 is a (meth) acrylic block copolymer MBC that is a triblock copolymer.

5. The watercraft or nautical object according to claim 4, wherein the triblock copolymer comprises one or more of pMMA-pBuA-pMMA, p(MMAcoMAA)-pBuA-p(MMAcoMAA), p(MMAcoMAA)-p(BuAcoSty)-p(MMAcoMAA) and p(MMAcoAA)-p(MMAcoAA).

6. The watercraft or nautical object according to according to claim 1, wherein the polydispersity index of the molecular weight Mw/Mn of the macromolecular sequences (II) having a flexible nature is greater than 2.

7. The watercraft or nautical object according to according to claim 4, wherein the polydispersity index of the molecular weight Mw/Mn of the macromolecular sequences (II) having a flexible nature is between 2.5 and 10.0.

8. The watercraft or nautical object according to claim 1, a substantial portion of which is transparent, and where the transparent portion comprises the polymeric composition PC1.

9. The watercraft or nautical object according to claim 8, wherein the & watercraft comprises a cavity (28).

10. The watercraft or nautical object according to claim 9, wherein the cavity has a volume between 100 cm³ and 100 m³.

11. The watercraft or nautical object according to claim 1, wherein at least 10% of a surface of the watercraft or nautical object in contact with water is transparent.

12. The watercraft or nautical object according to claim 1, wherein the nautical object is selected from the group consisting of a stand-up paddle, a surfboard, and a floating house.

13. A process for making a watercraft or nautical object that comprises a polymeric composition PC1, the polymeric composition PC1 comprising a transparent polymer TP1, wherein the process comprises:

1) providing a polymeric composition PC1 comprising a crosslinked (meth) acrylic composition comprising a brittle matrix (I) having a glass transition temperature of greater than 0° C. and of elastomeric domains having a characteristic dimension of less than 100 nm consisting of macromolecular sequences (II) having a flexible nature with a glass transition temperature of less than 0° C. wherein the macromolecular sequences
(II) having a flexible nature have a weight average molecular weight Mw of between 150,000 and 800,000 g/mol, said process comprising the steps of:

a) preparing the macromolecular sequences (II) by mixing, with the monomer(s) intended to form the macromolecular sequences (II), an alkoxyamine of general formula Z (-T) n, in which Z denotes a polyvalent group, T denotes a nitroxide and n is an integer greater than or equal to 1;

b) mixing the macromolecular sequences (II) of step a) with methyl methacrylate, and optionally a crosslinking agent, optionally at least one comonomer M and optionally at least one radical initiator;

c) mixing the composition comprising the macromolecular sequences (II) and methyl methacrylate with a crosslinking agent, optionally at least one comonomer M and at least one radical initiator, if it has not been done yet in step b);

d) casting the mixture obtained in the previous step in a mold and then heating it according to a temperature cycle in order to obtain a cast sheet, and 2) assembling polymeric composition PC1, wherein the transparent polymer TP1 is a (meth) acrylic block copolymer MBC, a (meth) acrylic polymer composition MP1, a crosslinked (meth)acrylic composition MCX, or blends thereof, wherein the crosslinked (meth)acrylic composition MCX comprises:

a brittle matrix (I) having a glass transition temperature of greater than 0° C. and elastomeric domains having a dimension of less than 100 nm consisting of macromolecular sequences (II) having a flexible nature with a glass transition temperature of less than 0° C., wherein the macromolecular sequences (II) are flexible and have a weight average molecular weight Mw of between 200,000 and 650,000 g/mol;

wherein the (meth) acrylic block copolymer MBC comprises at least one block where at least 50 wt % of the monomers inside the block are alkyl (meth) acrylate monomers that have been polymerized;

wherein the macromolecular sequences (II) comprise butyl acrylate and styrene in a ratio by weight of between 70/30 and 90/10, and wherein the nautical object is an object that floats on or in or under water.

14. The process according to claim 13, wherein the transparent polymer TP1 is a (meth) acrylic block copolymer MBC that is a triblock copolymer.

15. The process according to claim 2, wherein the triblock copolymer comprises one or more of pMMA-pBuA-pMMA, p(MMAcoMAA)-pBuA-p(MMAcoMAA), p(MMAcoMMA)-p(BuAcoSty)-p(MMAcoMAA) and p(MMAcoAA)-pBuA-p(MMAcoAA).

16. The process according to claim 13, wherein the process comprises an additional step of thermoforming the polymeric composition PC1.

17. The process according to claim 13, wherein the polymeric composition PC1 is provided in a form of a sheet having a thickness from 1 to 30 mm.

18. The process according to claim 13, wherein the assembling step of the polymeric composition PC comprises bonding with an adhesive or by welding or by thermo compressing.

* * * * *